(12) United States Patent
Kuboki et al.

(10) Patent No.: US 9,001,296 B2
(45) Date of Patent: Apr. 7, 2015

(54) LIQUID CRYSTAL DISPLAY APPARATUS

(75) Inventors: Ken Kuboki, Osaka (JP); Akira Shibazaki, Osaka (JP); Satomi Hasegawa, Osaka (JP); Hiroshi Tsuchiya, Osaka (JP); Yusuke Nishihara, Osaka (JP); Taichi Sasaki, Osaka (JP); Seiji Tanuma, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 40 days.

(21) Appl. No.: 14/001,150

(22) PCT Filed: Feb. 20, 2012

(86) PCT No.: PCT/JP2012/053954
§ 371 (c)(1),
(2), (4) Date: Aug. 22, 2013

(87) PCT Pub. No.: WO2012/115032
PCT Pub. Date: Aug. 30, 2012

(65) Prior Publication Data
US 2013/0329175 A1    Dec. 12, 2013

(30) Foreign Application Priority Data
Feb. 25, 2011  (JP) .................... 2011-040264

(51) Int. Cl.
*G02F 1/1337* (2006.01)
*G02F 1/1343* (2006.01)
*G02F 1/1362* (2006.01)

(52) U.S. Cl.
CPC ........ *G02F 1/133753* (2013.01); *G02F 1/1337* (2013.01); *G02F 1/1343* (2013.01); *G02F 1/1362* (2013.01)

(58) Field of Classification Search
USPC .................. 349/123, 128, 129, 130
See application file for complete search history.

(56) References Cited

U.S. PATENT DOCUMENTS

| 7,609,347 B2 * | 10/2009 | Lee et al. ...................... 349/128 |
| 8,144,294 B2 * | 3/2012 | Um et al. ...................... 349/129 |
| 2003/0071952 A1 | 4/2003 | Yoshida et al. |
| 2012/0236238 A1 * | 9/2012 | Kim et al. ...................... 349/123 |

FOREIGN PATENT DOCUMENTS

| JP | 2007-249243 A | 9/2007 |
| JP | 2008-197691 A | 8/2008 |
| JP | 2009-80197 A | 4/2009 |

OTHER PUBLICATIONS

International Search Report corresponding to PCT/JP2012/053954, dated May 1, 2012.

* cited by examiner

*Primary Examiner* — Edward Glick
*Assistant Examiner* — David Chung
(74) *Attorney, Agent, or Firm* — Lowe Hauptman & Ham, LLP

(57) ABSTRACT

A liquid crystal display apparatus includes an electrode and a slit formation region provided in the electrode and extending in a direction of extension of a boundary line, a first alignment region and a third alignment region are formed such that liquid crystal molecules are aligned toward a first director orientation, a second alignment region and a fourth alignment region are formed such that liquid crystal molecules are aligned toward a second director orientation greater in an angle of orientation than the first director orientation, an angle of orientation of a first slit orientation is not greater than an angle of orientation of the first director orientation, and an angle of orientation of a second slit orientation is not smaller than an angle of orientation of the second director orientation.

16 Claims, 17 Drawing Sheets

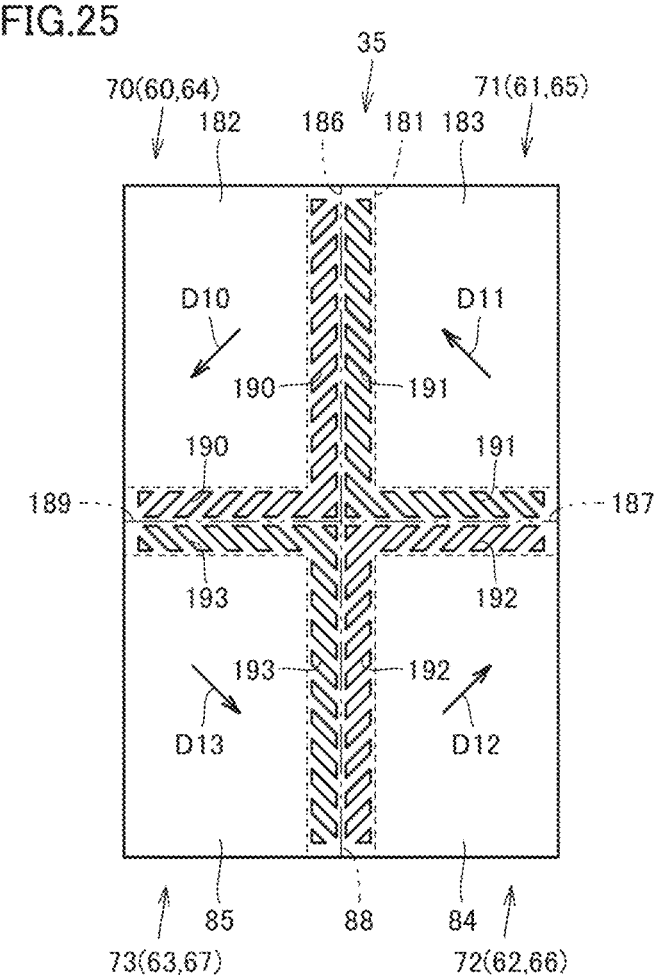

LIQUID CRYSTAL DISPLAY APPARATUS

RELATED APPLICATIONS

This application is a National Phase of International Application Number PCT/JP2012/053954 filed on Feb. 20, 2012, which is based upon and claims the benefit of priority from Japanese Patent Applications No. 2011-040264, filed on Feb. 25, 2011.

TECHNICAL FIELD

The present invention relates to a liquid crystal display apparatus and particularly to a liquid crystal display apparatus in which a plurality of domains are formed within a single pixel.

BACKGROUND ART

Various liquid crystal display apparatuses have conventionally been proposed, and particularly in recent years, various liquid crystal display apparatuses with focus being placed on improvement in a viewing angle, suppression of disclination, reduction in burn-in, and the like have been proposed.

For example, Japanese Patent Laying-Open No. 2007-249243 describes an RTN (Reverse Twisted Nematic) type liquid crystal display apparatus in which a plurality of domains are formed within a single pixel.

This RTN type liquid crystal display apparatus includes a pair of substrates, a plurality of domains formed within a single pixel, and domain restriction means for restricting a direction of leaning of a liquid crystal molecule in each domain.

In this Japanese Patent Laying-Open No. 2007-249243, a fish-bone-shaped electrode is exemplified as the domain restriction means.

By providing such domain restriction means, a direction of inclination of a liquid crystal molecule in each domain at the time of application of a voltage is each differed. By thus differing a direction of inclination of a liquid crystal molecule in each domain, a viewing angle is improved.

A liquid crystal display apparatus described in Japanese Patent Laying-Open No. 2008-197691 includes a domain formed within a single pixel and a perpendicular alignment film provided in a portion in contact with a liquid crystal layer.

The perpendicular alignment film has been subjected to an alignment process by emitting ultra violet (UV) rays from an oblique direction. Then, by differing a direction of emission of UV rays from place to place, a plurality of domains are formed. Then, this liquid crystal display apparatus includes a protruded bank such that liquid crystal molecules are aligned in an alignment restriction orientation for each domain at the time of application of a voltage.

A liquid crystal display apparatus described in Japanese Patent Laying-Open No. 2009-80197 includes a first substrate and a second substrate opposed to each other, a liquid crystal layer provided between the first substrate and the second substrate, a first electrode provided on the first electrode, and a second electrode provided on the second substrate.

Then, in this liquid crystal display apparatus as well, a plurality of domains are formed within a single pixel, and a slit is formed in at least one of the first electrode and the second electrode, in each domain. This slit is formed perpendicularly to an alignment orientation of liquid crystal molecules.

CITATION LIST

Patent Document

PTD 1: Japanese Patent Laying-Open No. 2007-249243
PTD 2: Japanese Patent Laying-Open No. 2008-197691
PTD 3: Japanese Patent Laying-Open No. 2009-80197

SUMMARY OF INVENTION

Technical Problem

In a liquid crystal display apparatus including a plurality of domains different in alignment orientation of liquid crystal molecules at the time of application of a voltage as above, a dark line appears in a boundary region between domains.

The present invention was made in view of the problems as described above, and an object thereof is to provide a liquid crystal display apparatus including a plurality of domains, in which occurrence of a dark line in a boundary region between domains is suppressed.

Solution to Problem

A liquid crystal display apparatus according to the present invention includes a liquid crystal layer containing a plurality of liquid crystal molecules, a first alignment film arranged to be adjacent to the liquid crystal layer, a first alignment region provided in the first alignment film, for aligning the liquid crystal molecules, and a second alignment region provided in the first alignment film and arranged to be adjacent to the first alignment region, for aligning the liquid crystal molecules. The liquid crystal display apparatus includes an electrode arranged opposite to the liquid crystal layer with respect to the first alignment film and a slit formation region provided in the electrode, opposed to a portion adjacent to a boundary line between the first alignment region and the second alignment region, and extending in a direction of extension of the boundary line. The liquid crystal display apparatus includes a first flat region in a flat surface shape, provided in the electrode, arranged to be adjacent to the slit formation region, and opposed to the first alignment region, a second flat region in a flat surface shape, provided in the electrode, arranged to be adjacent to the slit formation region, and opposed to the second alignment region, a plurality of first slits formed in a portion of the slit formation region, which is opposed to the first alignment region, and extending from a side of the boundary line toward the first flat region, and a plurality of second slits formed in a portion of the slit formation region, which is opposed to the second alignment region, and extending from the side of the boundary line toward the second flat region. The liquid crystal display apparatus includes a second alignment film including a third alignment region opposed to the first alignment region with the liquid crystal layer being interposed and a fourth alignment region opposed to the second alignment region with the liquid crystal layer being interposed.

The first alignment region and the third alignment region are formed such that liquid crystal molecules located in a central portion between the first alignment region and the third alignment region among the liquid crystal molecules are aligned in a first director orientation. The second alignment region and the fourth alignment region are formed such that liquid crystal molecules located in a central portion between the second alignment region and the fourth alignment region among the liquid crystal molecules are aligned in a second director orientation greater in angle of orientation than the first director orientation. A direction from a side of the first flat region toward the boundary line among directions of extension of the first slits is defined as a first slit orientation and a direction away from the boundary line among directions of extension of the second slits is defined as a second slit orientation. An angle of orientation of the first slit orientation is not greater than an angle of orientation of the first director orientation and an angle of orientation of the second slit orientation is not smaller than an angle of orientation of the second director orientation.

Preferably, an angle of intersection between the first slit orientation and the first director orientation is not smaller than 0° and smaller than 45°. Preferably, an angle of intersection between the second slit orientation and the second director orientation is not smaller than 0° and smaller than 45°.

Preferably, an angle of intersection between the first slit orientation and the first director orientation is not smaller than 0° and not greater than 30°, and an angle of intersection between the second slit orientation and the second director orientation is not smaller than 0° and not greater than 30°.

Preferably, the first slit and the second slit are formed at a distance from each other with the boundary line lying therebetween.

Preferably, the electrode is a pixel electrode. Preferably, the electrode is an opposing electrode. Preferably, an alignment restriction orientation of the first alignment region and an alignment orientation of the third alignment region intersect with each other. An alignment restriction orientation of the second alignment region and an alignment-orientation of the fourth alignment region intersect with each other.

Advantageous Effects of Invention

According to the liquid crystal display apparatus of the present invention, dark lines caused in a boundary region between domains can be decreased.

BRIEF DESCRIPTION OF DRAWINGS

FIG. 25 is a plan view showing an example where slits are formed in a common electrode 35.

DESCRIPTION OF EMBODIMENTS

A liquid crystal display apparatus according to the present first embodiment will be described with reference to FIGS. 1 to 25.

Figure 1:
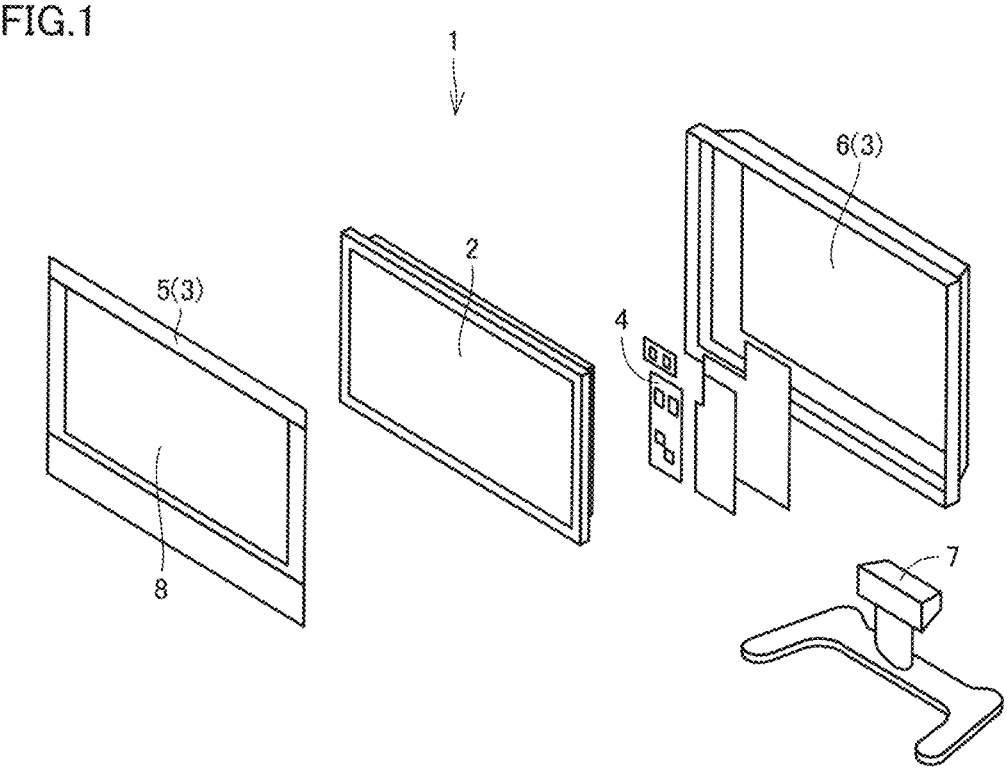
FIG. 1 is an exploded perspective view of a television receiver 1 incorporating a liquid crystal display apparatus according to the present first embodiment.

FIG. 1 is an exploded perspective view of a television receiver 1 incorporating the liquid crystal display apparatus according to the present first embodiment.

Television receiver 1 includes a liquid crystal display apparatus 2, a housing 3 accommodating liquid crystal display apparatus 2, and a control unit 4 for controlling drive of liquid crystal display apparatus 2.

Housing 3 includes a front panel 5 arranged on a front surface side of liquid crystal display apparatus 2, a back surface case 6 arranged on a back surface side of liquid crystal display apparatus 2, and a base 7 supporting back surface case 6. A window portion 8 for externally exposing a screen of liquid crystal display apparatus 2 is formed in front panel 5, and front panel 5 is formed in a frame shape.

Figure 2:
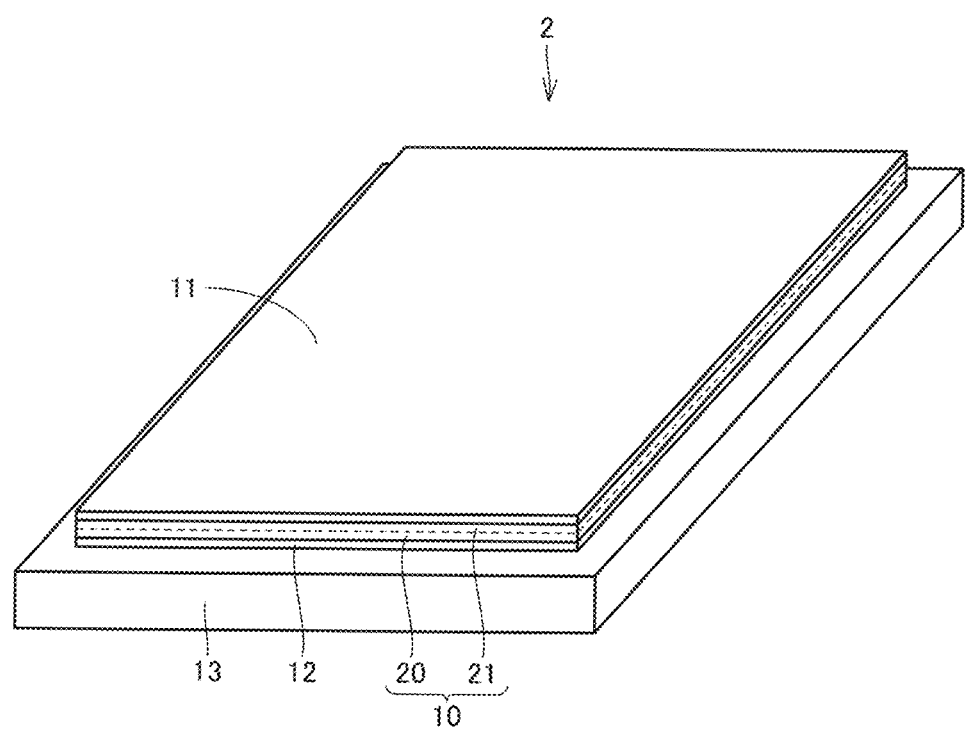
FIG. 2 is a perspective view schematically showing a liquid crystal display apparatus 2.

FIG. 2 is a perspective view schematically showing liquid crystal display apparatus 2. As shown in this FIG. 2, liquid crystal display apparatus 2 includes a liquid crystal display panel 10 formed in a plate shape, a polarizing plate 11 provided on one main surface of liquid crystal display panel 10, a polarizing plate 12 provided on the other main surface of liquid crystal display panel 10, and a backlight unit 13 emitting light toward liquid crystal display panel 10.

Polarizing plate 11 and polarizing plate 12 are arranged such that a direction of oscillation of light allowed to pass through polarizing plate 11 and a direction of oscillation of light allowed to pass through polarizing plate 12 are orthogonal to each other. Backlight unit 13 includes, for example, a light source having a plurality of LEDs, or the like.

Liquid crystal display panel 10 includes an active matrix substrate 20 arranged on a side of backlight unit 13 and an opposing substrate 21 arranged on active matrix substrate 20.

Figure 3:
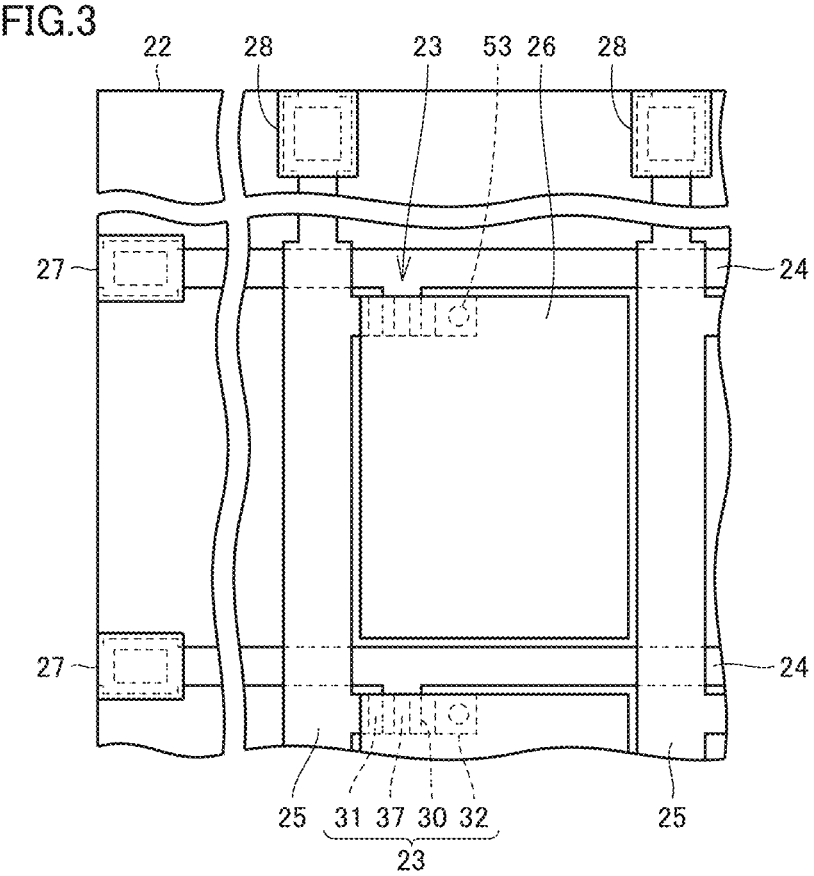
FIG. 3 is a plan view schematically showing a circuit formed in an active matrix substrate 20.

FIG. 3 is a plan view schematically showing a circuit formed in active matrix substrate 20. As shown in this FIG. 3, active matrix substrate 20 includes a transparent substrate 22, a plurality of switching elements 23 formed in an array on a main surface of this transparent substrate 22, a gate interconnection 24 connected to a gate electrode of switching element 23, a source interconnection 25 connected to a source electrode of switching element 23, and a pixel electrode 26 connected to a drain electrode of switching element 23. It is noted that an example where the invention of the present application is applied to a liquid crystal display apparatus is described in the present first embodiment and hence a transparent substrate such as a glass substrate is adopted for transparent substrate 22.

Switching element 23 includes a gate electrode 30, a source electrode 31, and a drain electrode 32, and for example, a switching element such as an MIM (metal-insulator-metal) diode or a thin film transistor (TFT) is adopted for switching element 23.

Gate interconnection 24 is formed in a first direction in an elongated manner and a plurality of gate interconnections 24 are formed at a distance from one another in a second direction orthogonal to the first direction. One end portion of gate interconnection 24 is provided with a gate terminal portion 27.

Source interconnection 25 is formed in the second direction in an elongated manner, and a plurality of source interconnections 25 are formed at a distance from one another in the first direction. One end portion of source interconnection 25 is provided with a source terminal portion 28.

Gate terminal portions 27 are aligned along one side portion of transparent substrate 22, and source terminal portions 28 are aligned along one long side portion of transparent substrate 22.

Figure 4:
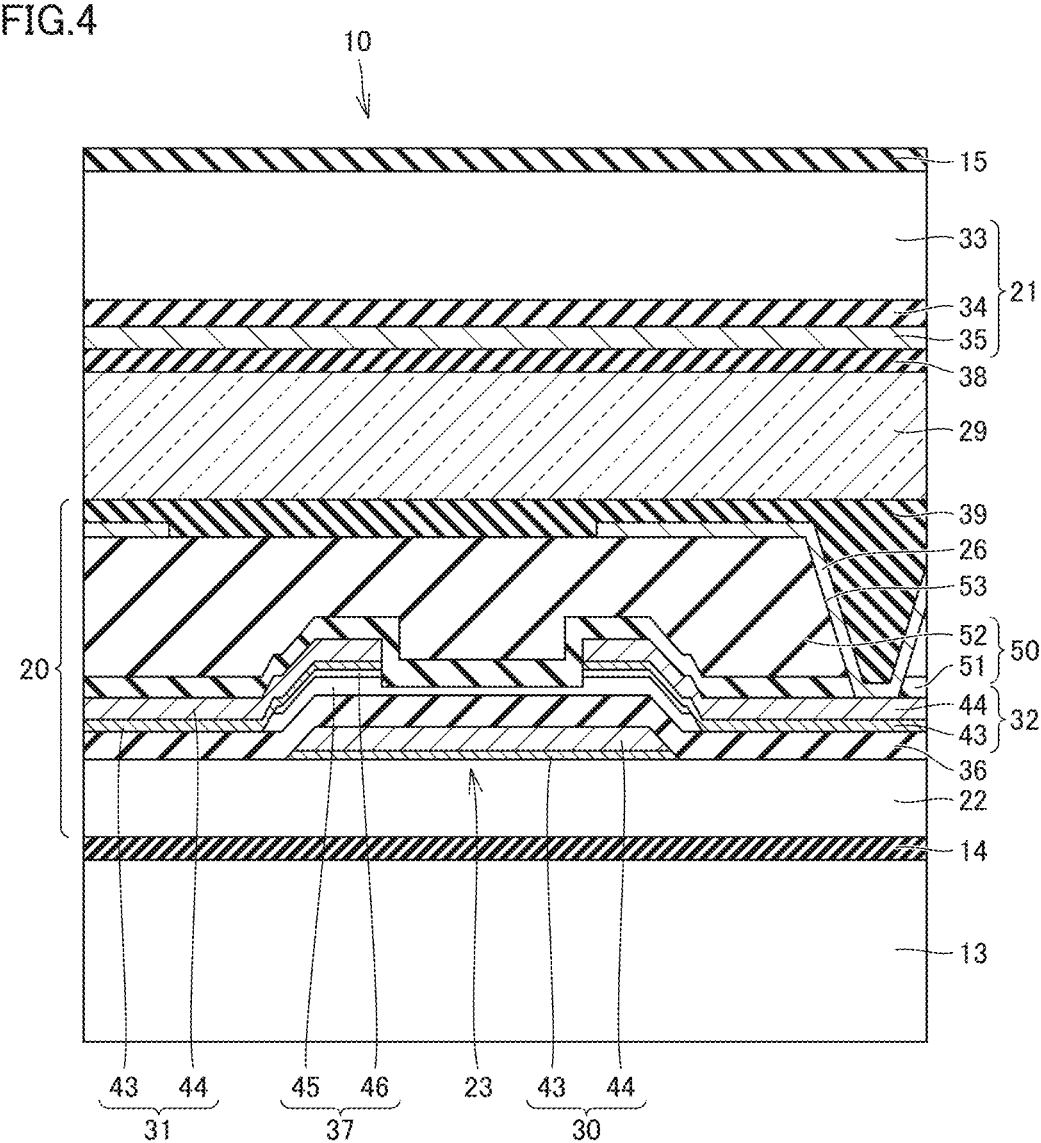
FIG. 4 is a cross-sectional view of a liquid crystal display panel 10 including a switching element 23.

FIG. 4 is a cross-sectional view of liquid crystal display panel 10 including switching element 23. As shown in this FIG. 4, liquid crystal display panel 10 includes active matrix substrate 20, opposing substrate 21 provided at a distance from active matrix substrate 20, a liquid crystal layer 29 provided between active matrix substrate 20 and opposing substrate 21 and serving as a display medium layer, an alignment film 39 provided on an upper surface of active matrix substrate 20, an alignment film 38 provided on a main surface of main surfaces of opposing substrate 21, which is opposed to active matrix substrate 20, a polarizing plate 14 provided on transparent substrate 22, and a polarizing plate 15 provided on a transparent substrate 33. It is noted that backlight unit 13 emits light toward active matrix substrate 20.

Opposing substrate 21 includes transparent substrate 33 such as a glass substrate, a color filter 34 provided on a main surface of transparent substrate 33, a common electrode 35 provided closer to active matrix substrate 20 than color filter 34, and alignment film 38 arranged closer to active matrix substrate 20 than common electrode 35.

Alignment film 38 is in contact with liquid crystal layer 29, and common electrode 35 is located opposite to liquid crystal layer 29, with respect to alignment film 38. Alignment film 38 is formed of an organic material having a photosensitive group. Alignment film 38 has been subjected to an optical alignment process with the use of UV rays, and a plurality of fine protrusions of the pico order are formed on a surface of alignment film 38 on the side of liquid crystal layer 29. Specifically, the alignment film is formed such that a main chain of an alignment film polymer forming the alignment film is arranged on a surface of the substrate and a side chain stands in a substantially perpendicular direction.

Active matrix substrate 20 includes switching element 23 provided on the main surface of transparent substrate 22, an interlayer insulating film 50 provided to cover this switching element 23, pixel electrode 26 formed on an upper surface of interlayer insulating film 50, and alignment film 39 formed on this pixel electrode 26. Interlayer insulating film 50 includes a passivation film 51 and a planarizing film 52 formed on passivation film 51. Passivation film 51 is formed, for example, from an inorganic insulating film such as a silicon nitride film, and planarizing film 52 is formed, for example, from an organic insulating film of an acrylic resin or the like.

Switching element 23 includes gate electrode 30 formed on the main surface of transparent substrate 22, a gate insulating film 36 formed on the main surface of transparent substrate 22 so as to cover this gate electrode 30, and a semiconductor layer 37 formed on an upper surface of gate insulating film 36 located on gate electrode 30. Switching element 23 includes source electrode 31 formed on semiconductor layer 37 and drain electrode 32 provided at a distance from source electrode 31.

Gate electrode 30 is formed from a stack metal film including a lower metal film 43 and an upper metal film 44 formed on an upper surface of this lower metal film 43. Similarly, source electrode 31 and drain electrode 32 are also formed from a stack metal film including lower metal film 43 and upper metal film 44, similarly to gate electrode 30.

For upper metal film 44 and lower metal film 43, for example, Cu (copper) can be adopted for upper metal film 44 and Ti (titanium) can be adopted for lower metal film 43.

Semiconductor layer 37 includes an amorphous silicon film 45 and an n+ amorphous silicon film 46 formed on this amorphous silicon film 45.

Source electrode 31 includes lower metal film 43 and upper metal film 44 formed on lower metal film 43. Drain electrode 32 includes lower metal film 43 and upper metal film 44 formed on this lower metal film 43.

A contact hole 53 is formed to reach an upper surface of drain electrode 32 in interlayer insulating film 50 and pixel electrode 26 is connected through this contact hole 53 to drain electrode 32. Pixel electrode 26 is formed from a transparent conductive film such as an ITO film or an IZO film. It is noted that a slit is formed in this pixel electrode 26 and details thereof will be described later. Alignment film 39 is formed on interlayer insulating film 50 so as to cover pixel electrode 26.

Polarizing plate 14 is provided on the main surface located opposite to the main surface provided with switching element 23, of the two main surfaces of transparent substrate 22.

Polarizing plate 15 is arranged opposite to the main surface having color filter 34 formed, of the two main surfaces of transparent substrate 33. An absorption axis of polarizing plate 14 and an absorption axis of polarizing plate 15 are arranged to be orthogonal to each other.

Alignment film 39 is arranged to be adjacent to liquid crystal layer 29, and pixel electrode 26 is arranged opposite to liquid crystal layer 29, with respect to alignment film 39.

Alignment film 39 is formed of an organic material having a photosensitive group. Alignment film 39 has been subjected to an optical alignment process with the use of UV rays, and a plurality of fine protrusions of the pico order are formed on the surface of alignment film 39 in contact with liquid crystal layer 29. Specifically, the alignment film is formed such that a main chain of an alignment film polymer forming the alignment film is arranged on the surface of the substrate and a side chain stands in a substantially perpendicular direction. Liquid crystal layer 29 includes a plurality of liquid crystal molecules.

Figure 5:
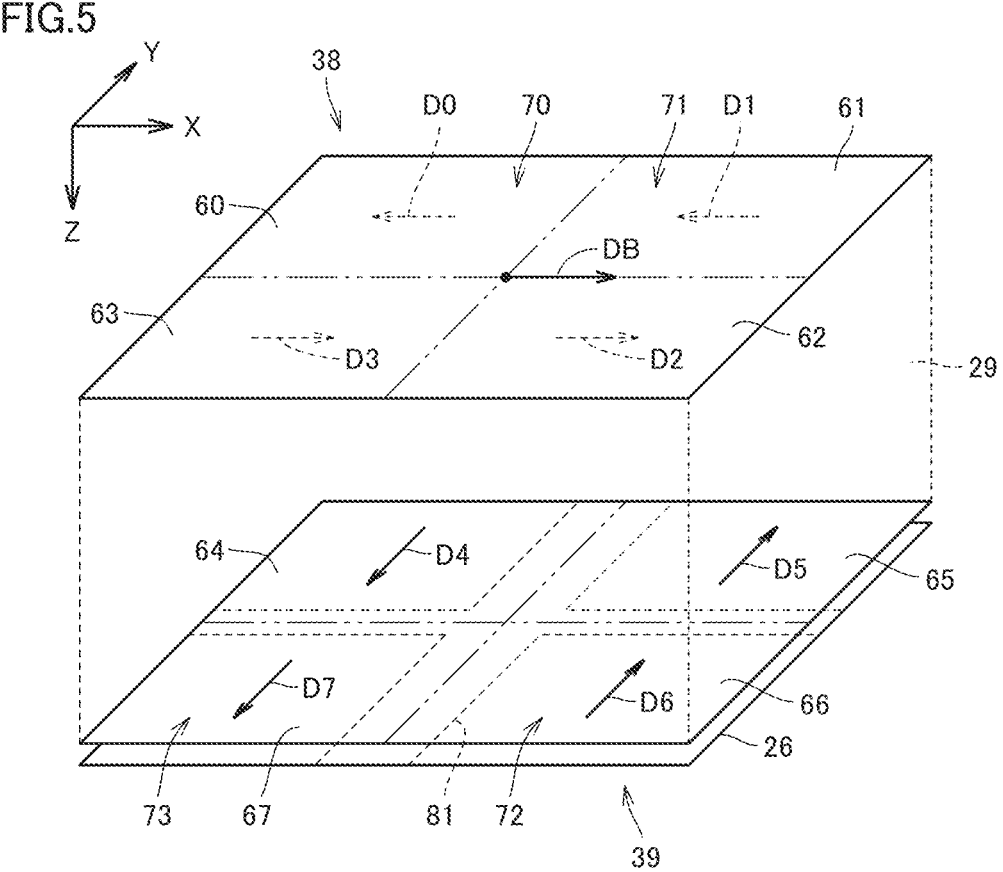
FIG. 5 is a perspective view showing a pixel electrode 26, a part of an alignment film 38, and a part of an alignment film 39.

FIG. 5 is a perspective view showing pixel electrode 26, a part of alignment film 38, and a part of alignment film 39. In this FIG. 5, a direction of a Z axis is a direction of observation at the time when an observer perpendicularly observes a screen.

Alignment film 38 includes a plurality of alignment regions 60 to 63. Alignment region 60 and alignment region 61 are adjacent in a direction of a line of an X axis, and alignment region 63 and alignment region 62 are arranged to be adjacent in the direction of the line of the X axis. It is noted that alignment region 60 and alignment region 63 are arranged to be adjacent in a direction of a line of a Y axis, and alignment region 61 and alignment region 62 are arranged to be adjacent in the direction of the line of the Y axis.

It is noted that alignment regions 60 to 63 have been subjected to an optical alignment process such that liquid crystal molecules within liquid crystal layer 29 are aligned in a prescribed direction, and alignment orientations of alignment regions 60, 61, 62, 63 are defined as alignment orientations (alignment restriction orientations) D0, D1, D2, D3, respectively. Here, each alignment orientation D0, D1, D2, D3 is defined by a side chain protruding from alignment region 60, 61, 62, 63. Specifically, a side chain protruding from alignment region 60 is inclined toward alignment orientation D0, from alignment region 60 toward alignment region 64. Similarly, a side chain formed in alignment region 61 is inclined toward alignment orientation D1, from alignment region 61 toward an alignment region 65. In addition, side chains formed in alignment regions 62, 63 are inclined toward alignment orientations D2, D3, from alignment regions 62, 63 toward alignment regions 66, 67, respectively.

An angle of orientation of each alignment orientation D0, D1, D2, D3 is set, with a reference orientation DB serving as the reference. Specifically, in a state where an observer observes a screen straight from the front, an orientation at 3 o'clock is defined as reference orientation DB. Then, an angle in a counterclockwise direction with respect to reference orientation DB is defined as an angle of orientation of each alignment orientation D0, D1, D2, D3. In the example shown in this FIG. 5, an angle of orientation of alignment orientation D0, D1 is 180°. In addition, an angle of orientation of alignment orientation D2, D3 is 0°. Alignment orientation D0 and alignment orientation D1 are the same orientation, and alignment orientation D2 and alignment orientation D3 are the same orientation.

Alignment film 39 includes alignment regions 64 to 67. Alignment region 64 is opposed to alignment region 60, and alignment region 65 is opposed to alignment region 61. Alignment region 66 is opposed to alignment region 62, and alignment region 67 is opposed to alignment region 63.

Alignment regions 64 to 67 have been subjected to an optical alignment process such that liquid crystal molecules within liquid crystal layer 29 are aligned in a prescribed direction.

Alignment orientations of alignment regions 64, 65, 66, 67 are defined as alignment orientations D4, D5, D6, D7, respectively. It is noted that side chains formed in alignment regions 64, 67 are inclined toward alignment orientations D4, D7, from alignment regions 64, 67 toward alignment regions 60, 63, respectively. Similarly, side chains formed in alignment regions 65, 66 are inclined toward alignment orientations D5, D6, from alignment regions 65, 66 toward alignment regions 61, 62, respectively. An angle of orientation of alignment orientation D4 and alignment orientation D7 is 270°, and an angle of orientation of alignment orientation D5 and alignment orientation D6 is 90°.

Then, alignment region 60 and alignment region 64 form a domain 70, and alignment region 61 and alignment region 65 form a domain 71. Similarly, alignment region 62 and alignment region 66 form a domain 72, and alignment region 63 and alignment region 67 form a domain 73.

Figure 6:
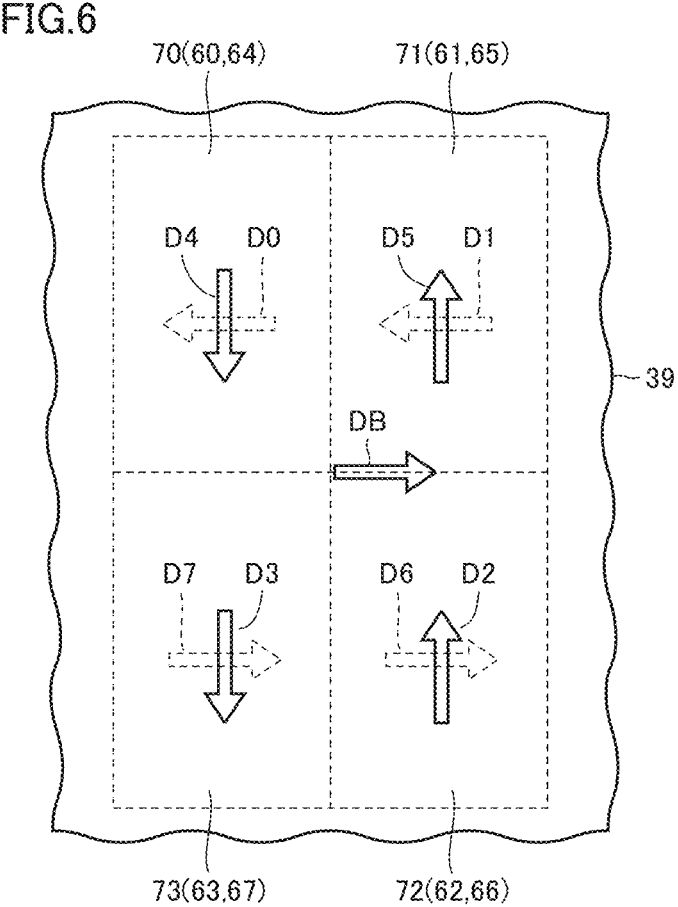
FIG. 6 is a plan view when alignment film 38 and alignment film 39 shown in FIG. 5 are viewed from above alignment film 38.
Figure 7:
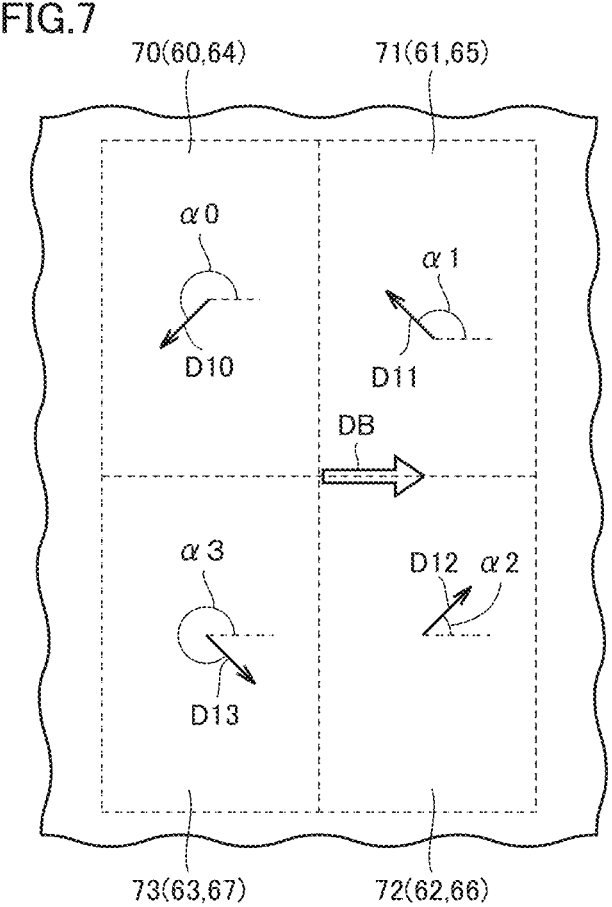
FIG. 7 is a plan view when alignment film 38 and alignment film 39 shown in FIG. 5 are viewed from above alignment film 38.

FIGS. 6 and 7 are plan views when alignment film 38 and alignment film 39 shown in FIG. 5 are viewed from above alignment film 38.

Here, in FIGS. 6 and 7, a director orientation of domain 70 is determined by alignment orientation D0 and alignment orientation D4, and as shown in FIG. 7, an angle of orientation $\alpha 0$ of director orientation D10 of domain 70 is set to 225°.

A director orientation D11 of domain 71 is defined by alignment orientation D1 and alignment orientation D5, and an angle of orientation $\alpha 1$ of director orientation D11 is 135°.

A director orientation D12 of domain 72 is defined by alignment orientation D2 and alignment orientation D6, and an angle of orientation $\alpha 2$ of director orientation D12 is 45°.

A director orientation D13 of domain 73 is defined by alignment orientation D3 and an alignment orientation D7, and an angle of orientation $\alpha 3$ of director orientation D13 is 315°.

The angles of orientation are set such that the angle of orientation of the director orientation increases in the order of domain 72, domain 71, domain 70, and domain 73. It is noted that an angle of orientation of each director orientation is set to an angle of counterclockwise rotation, with reference orientation DB serving as the reference.

As shown in FIG. 5, a plurality of domains 70 to 73 are formed above one pixel electrode 26. It is noted that, in the example shown in this FIG. 5, a 4-domain system in which 4 domains are provided is adopted.

Then, attention being paid to domain 73, a behavior of liquid crystal molecules in domain 73 in a non-application state where no voltage is applied across the pixel electrode and the common electrode and in a state where a voltage is applied will be described.

Figure 8:
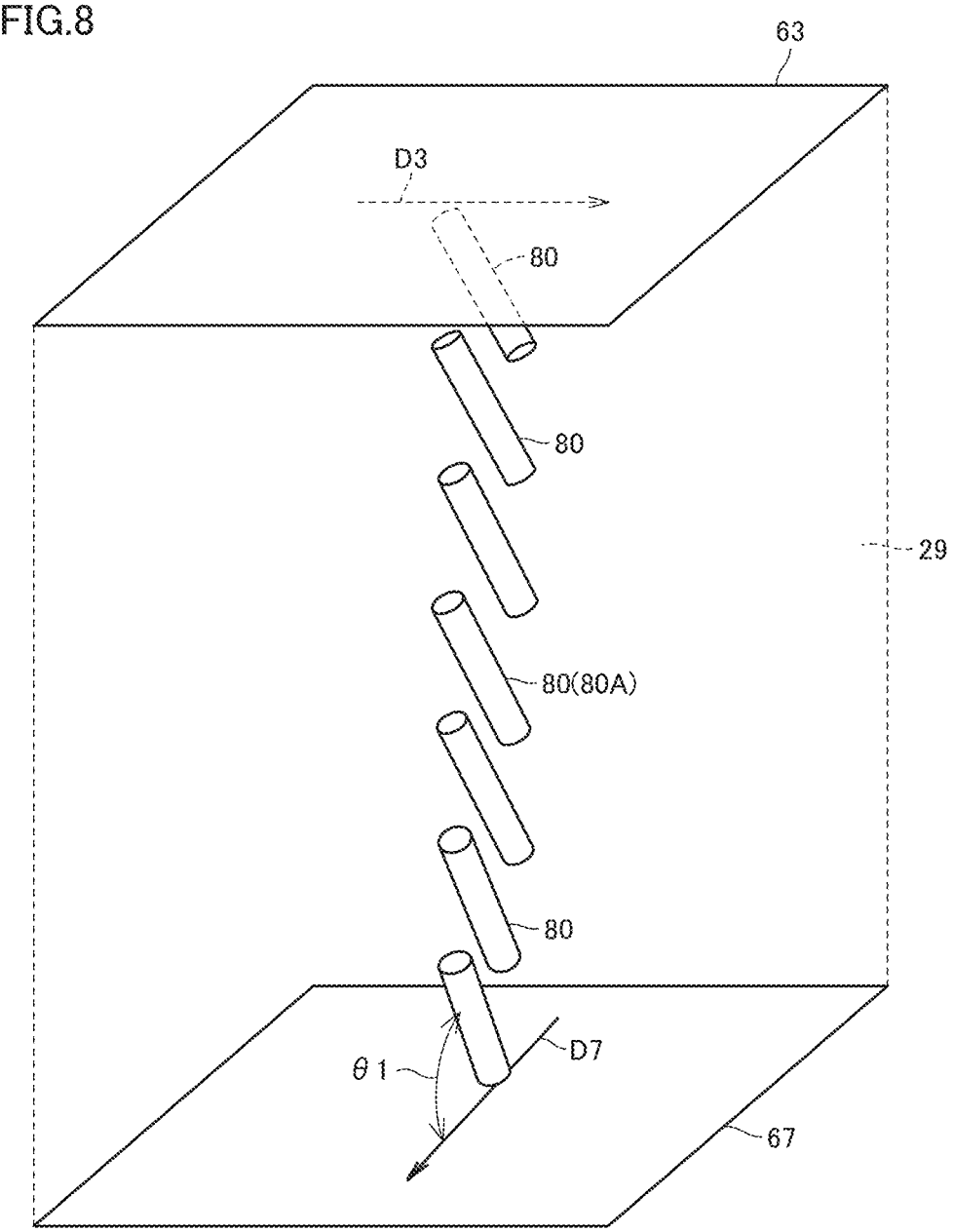
FIG. 8 is a perspective view showing an alignment region 63 and an alignment region 67, showing a state where no voltage is applied across a common electrode and a pixel electrode.

FIG. 8 is a perspective view showing alignment region 63 and alignment region 67, showing a state where no voltage is applied across the common electrode and the pixel electrode.

In FIG. 8, liquid crystal molecules 80 located in the vicinity of alignment region 67 are aligned in alignment orientation D7 by the side chains formed in alignment region 67. Then, a tilt angle of liquid crystal molecule 80 located on alignment region 67 is set to a pre-tilt angle $\theta 1$ of approximately 88.2°.

Then, liquid crystal molecules 80 located above are also laid out in accordance with liquid crystal molecule 80 located on alignment region 67.

Liquid crystal molecules 80A among liquid crystal molecules 80 located between alignment region 63 and alignment region 67 are located in a central portion between alignment region 63 and alignment region 67.

A tilt angle formed between this liquid crystal molecule 80A and alignment region 67 is set, for example, to around 88.2°.

As shown in this FIG. 8, in a state where no voltage is applied across the common electrode and the pixel electrode, liquid crystal molecules 80A are in a substantially erected state.

In FIG. 4, light from backlight unit 13 passes through polarizing plate 14, passes through liquid crystal layer 29, color filter 34, and polarizing plate 15, and is emitted to the outside.

Here, in the state where liquid crystal molecules 80 are erected as shown in FIG. 8, light incident through polarizing plate 14 is cut off by polarizing plate 15 without being polarized by liquid crystal layer 29. Namely, the liquid crystal display apparatus according to the present embodiment is a normally black type liquid crystal display apparatus.

Figure 9:
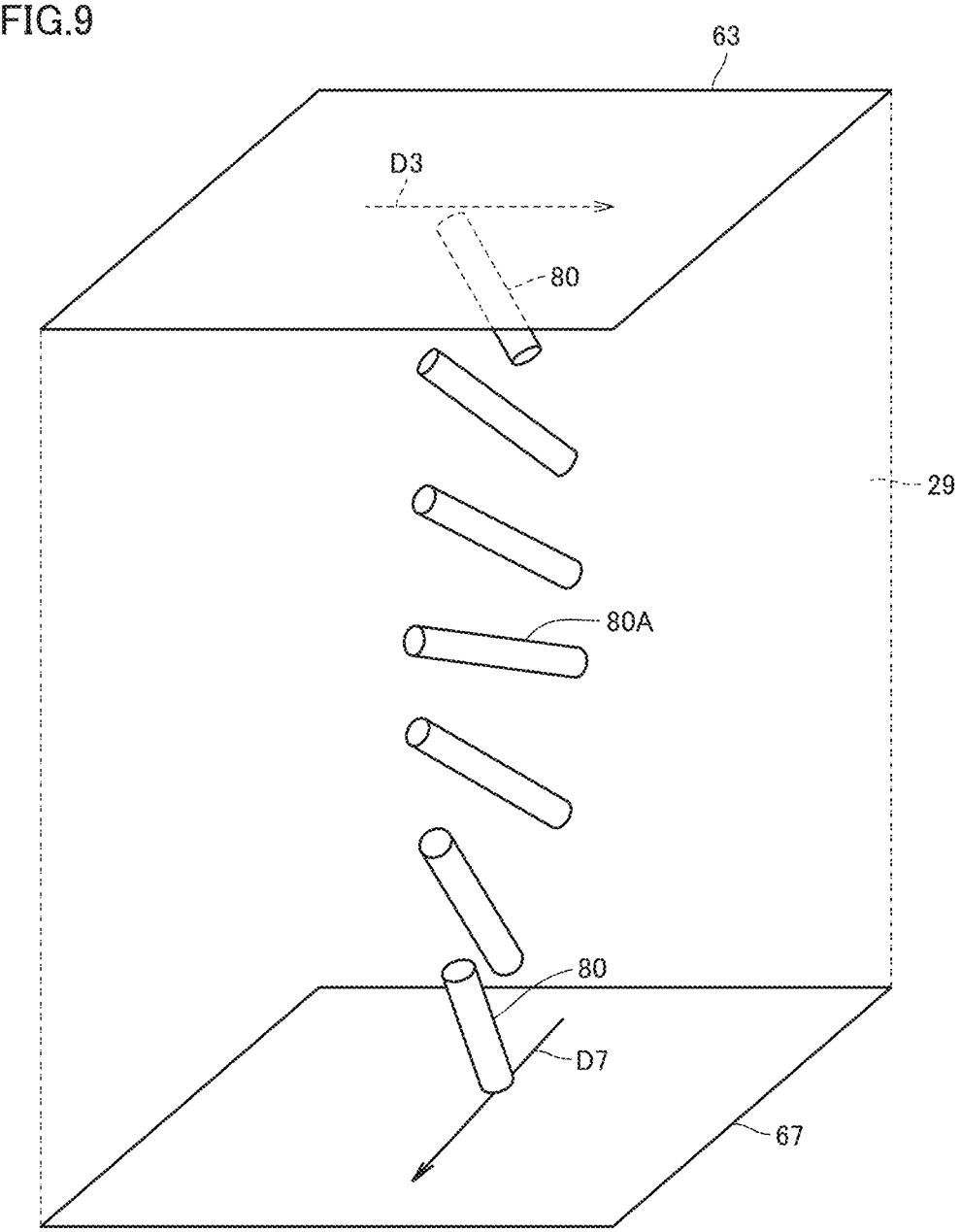
FIG. 9 is a perspective view showing alignment region 63 and alignment region 67, in a state where a voltage is applied across the common electrode and the pixel electrode.

FIG. 9 is a perspective view showing alignment region 63 and alignment region 67, and a perspective view in a state where a voltage is applied across the common electrode and the pixel electrode. As shown in this FIG. 9, liquid crystal molecules 80 are inclined in director orientation D13 shown in FIG. 7 above, as they are away from alignment region 63 and alignment region 67. Then, among liquid crystal molecules 80 located between alignment region 63 and alignment region 67, liquid crystal molecules 80A located in the central portion between alignment region 63 and alignment region 67 are aligned toward director orientation D13. It is noted that Table 1 below shows a "tilt angle (°)" and an "angle of orientation (°)" of each liquid crystal molecule in a state where a voltage is applied. It is noted that a "position in cell cross-section" indicates a distance from arrangement alignment region 67. The "tilt angle" is an angle formed between alignment region 67 and a liquid crystal molecule.

TABLE 1

| Position in Cell Cross-Section | Tilt Angle | Angle of Orientation |
| --- | --- | --- |
| 0 | 0 | 0 |
| 0.05 | 88.2 | −90 |
| 0.39 | 27.4574 | −50.0851 |
| 0.73 | 12.8723 | −48.9394 |
| 1.07 | 6.04389 | −47.7174 |
| 1.41 | 3.19756 | −46.5112 |
| 1.75 | 2.42779 | −45.314 |
| 2.09 | 3.22671 | −44.1282 |
| 2.43 | 6.11168 | −42.954 |
| 2.77 | 13.0014 | −41.7772 |
| 3.11 | 27.6854 | −40.6644 |
| 3.45 | 88.2 | 0 |
| 3.5 | 0 | 0 |

In such a state that a layout of liquid crystal molecules 80 is thus twisted, a direction of oscillation of light from backlight unit 13 is twisted while it travels from alignment region 67 to alignment region 63. Consequently, light from alignment region 63 to the outside passes through polarizing plate 15 shown in FIG. 4. Thus, in domain 73 formed by alignment region 67 and alignment region 63 in FIG. 7, liquid crystal molecules located in the central portion in a direction of thickness are aligned toward director orientation D13 by application of a voltage.

Similarly, in FIG. 7, in domain 71, liquid crystal molecules located in the central portion between alignment region 61 and alignment region 65 are inclined toward director orientation D11.

In domain 70, liquid crystal molecules located in the central portion in a direction of thickness are inclined toward director orientation D10. In addition, in domain 72, liquid crystal molecules located in the central portion in a direction of thickness are inclined toward director orientation D12.

Thus, since a direction of inclination of liquid crystal molecules is different for each domain, variation in tone can be suppressed even when an observer views the screen in multiple directions.

Figure 10:
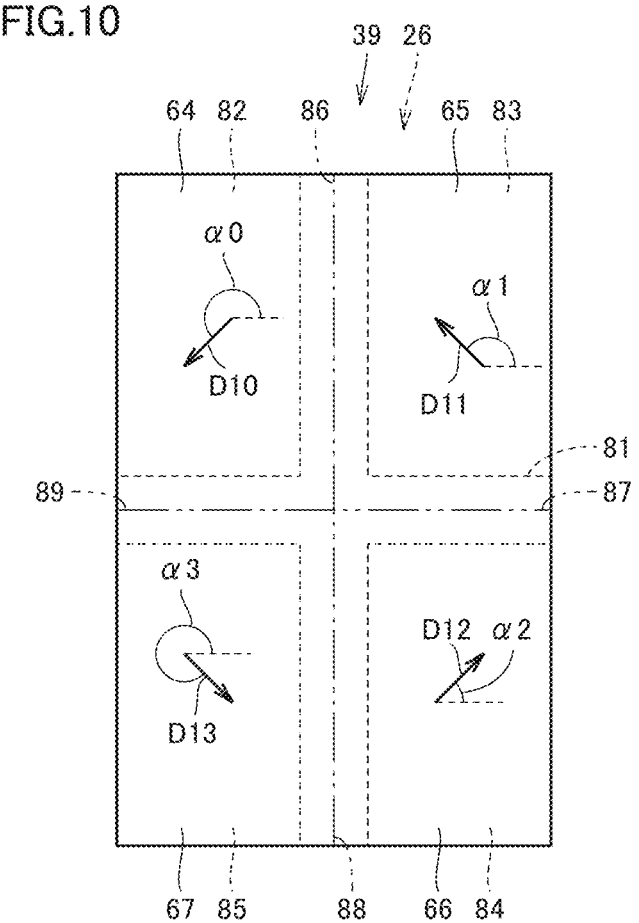
FIG. 10 is a plan view when pixel electrode 26 and alignment film 39 shown in FIG. 5 are two-dimensionally viewed from above alignment film 39.

FIG. 10 is a plan view when pixel electrode 26 and alignment film 39 shown in FIG. 5 are two-dimensionally viewed from above alignment film 39. In FIG. 10, a boundary portion between alignment region 64 and alignment region 65 is defined as a boundary line 86, and a boundary portion between alignment region 65 and alignment region 66 is defined as a boundary line 87. In addition, a boundary portion between alignment region 66 and alignment region 67 is defined as a boundary line 88. Furthermore, a boundary portion between alignment region 67 and alignment region 64 is defined as a boundary line 89.

Pixel electrode 26 includes a slit formation region 81 opposed to portions in alignment regions 64, 65, 66, 67, which are adjacent to boundary lines 86, 87, 88, 89, respectively, and extending in directions of extension of boundary lines 86, 87, 88, 89, and flat surface regions 82, 83, 84, 85 arranged to be adjacent to this slit formation region 81.

Figure 11:
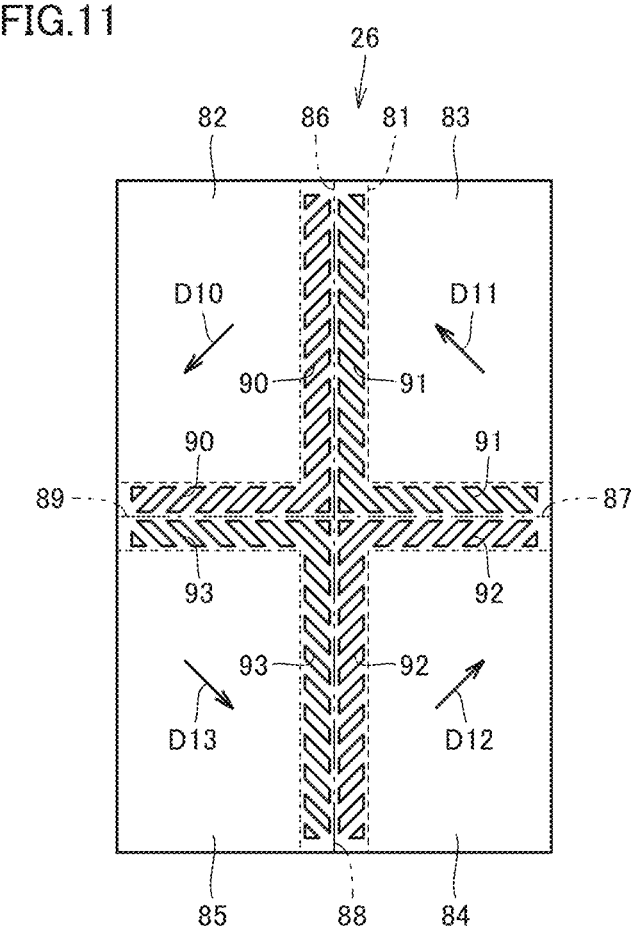
FIG. 11 is a plan view of pixel electrode 26.

FIG. 11 is a plan view of pixel electrode 26. As shown in this FIG. 11, a plurality of slits 90, 91, 92, 93 are formed in slit formation region 81.

Specifically, a plurality of slits 90 are formed in a portion of slit formation region 81 of pixel electrode 26, which is opposed to alignment region 64 shown in FIG. 10. A plurality of slits 91 are formed in a portion of slit formation region 81, which is opposed to alignment region 65 shown in FIG. 10.

A plurality of slits 92 are formed in a portion of slit formation region 81, which is opposed to alignment region 66 shown in FIG. 10. A plurality of slits 93 are formed in a portion of slit formation region 81, which is opposed to alignment region 67 shown in FIG. 10.

Slits 90 are formed at a distance from one another along boundary line 86 and boundary line 89, and slits 91 are formed at a distance from one another along boundary line 86 and boundary line 87. Slits 92 are formed at a distance from one another along boundary line 87 and boundary line 88. Slits 93 are formed at a distance from one another along boundary line 88 and boundary line 89.

Flat surface regions 82, 83, 84, 85 have no slit formed and are formed in a flat surface shape.

Flat surface region 82 is arranged to be adjacent to a portion of slit formation region 81 where slits 90 are located, and flat surface region 83 is arranged to be adjacent to a portion of slit formation region 81 where slits 91 are located. Flat surface region 84 is arranged to be adjacent to a portion of slit formation region 81 where slits 92 are located. Flat surface region 85 is arranged to be adjacent to a portion of slit formation region 81 where slits 93 are located.

Figure 12:
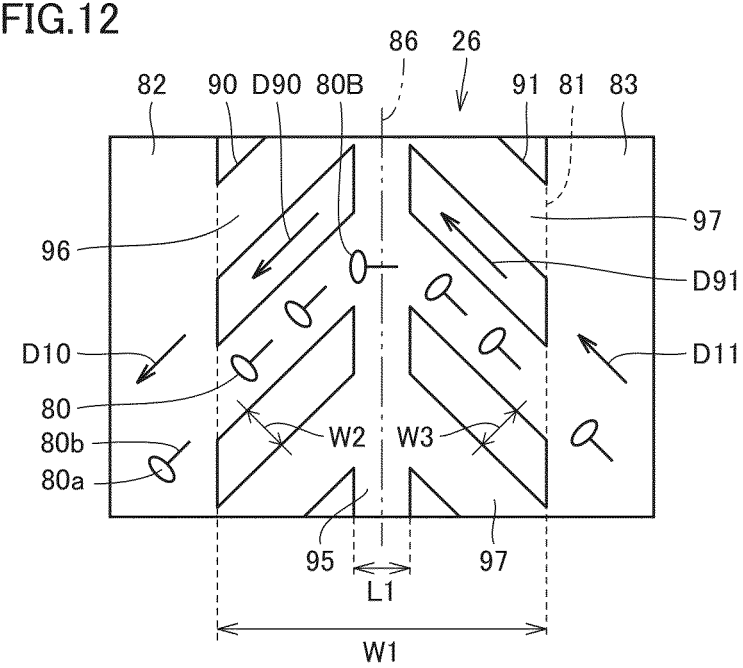
FIG. 12 is a plan view showing slits 90, 91 and a portion located around the same in FIG. 11.

FIG. 12 is a plan view showing slits 90, 91 and a portion located around the same in FIG. 11 above. It is noted that this FIG. 12 schematically shows liquid crystal molecules 80 in a drawing pin shape. Then, an end portion 80a of liquid crystal molecule 80 shows an end portion located on an observer side when the observer observes the screen. A shaft portion 80b of liquid crystal molecule 80 shows a body portion of liquid crystal molecule 80 in an oblong shape.

As shown in FIG. 12, pixel electrode 26 includes a trunk portion 95 located in a portion located between slit 90 and slit 91, a branch portion 96 connected to this trunk portion 95 and located between slits 90, and a branch portion 97 connected to trunk portion 95 and located between slits 91.

A width W1 of slit formation region 81 is set, for example, to approximately 20 μm. Slit 90 and slit 91 are arranged at a distance from each other with boundary line 86 lying therebetween. A distance L1 between slit 90 and slit 91 is set, for example, to approximately 4 μm.

A width W2 of slit 90 is set, for example, to approximately 3 μm, and an interval between slits 90 is set, for example, to approximately 4 μm. Similarly, A width W3 of slit 91 is set, for example, to approximately 3 μm, and an interval between slits 91 is set also to approximately 4 μm.

Here, slit 90 extends from the side of boundary line 86 toward flat surface region 82, and slit 91 also extends from the side of boundary line 86 toward flat surface region 83.

Then, a direction extending from the side of boundary line 86 toward flat surface region 82, among directions of extension of slits 90, is defined as an extension orientation D90 of slit 90.

A direction extending from the side of flat surface region 83 toward boundary line 86, among directions of extension of slits 91, is defined as an extension orientation D91 of slit 91.

In this FIG. 12 and FIG. 7 above, director orientation D10 of domain 70 located on flat surface region 82 is 225° and director orientation D11 of domain 71 located on flat surface region 83 is 135°.

An angle of orientation of extension orientation D90 of slit 90 is not smaller than the angle of orientation of director orientation D10, and in the example shown in FIG. 12, it is set to 225° which is the same as that of director orientation D10.

An angle of orientation of extension orientation D91 of slit 91 is not greater than the angle of orientation of director orientation D11. Then, extension orientation D91 of slit 91 is set to 135° which is equal to that of director orientation D11.

It is noted that, when a direction from the side of boundary line 88 toward flat surface region 84, among directions of extension of slits 92 shown in FIG. 11, is defined as an extension orientation of slits 92, the extension orientation of slits 92 is the same orientation as the extension orientation of slits 90.

When an orientation from the side of flat surface region 85 toward boundary line 88, among directions of extension of slits 93, is defined as an extension orientation of slits 93, the extension orientation of slits 93 is the same orientation as the extension orientation of slits 91.

Liquid crystal molecules 80 shown in FIG. 12 are liquid crystal molecules 80 at the time when a prescribed potential is applied across the pixel electrode and the common electrode, and indicate liquid crystal molecules 80 located in the central portion in the direction of thickness of the liquid crystal layer.

Here, liquid crystal molecules 80 located on flat surface region 82 are inclined toward director orientation D10 of domain 70. Liquid crystal molecules 80 located on flat surface region 83 are inclined toward director orientation D11 of domain 71.

Figure 13:
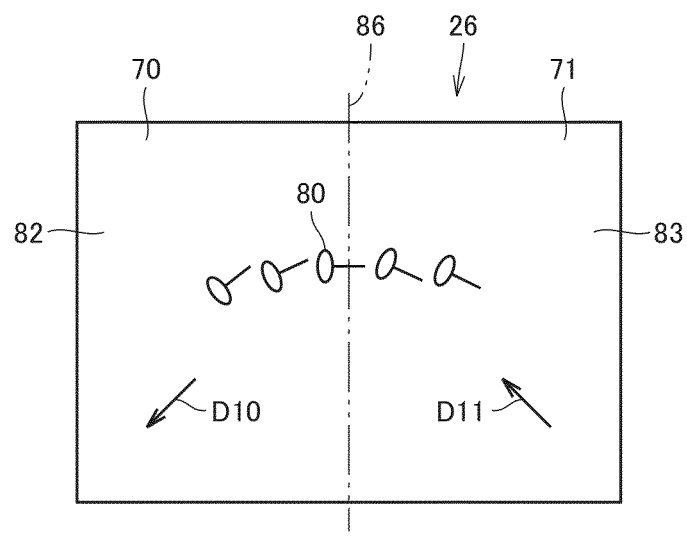
FIG. 13 is a plan view showing a comparative example in a case where no slit 90, 91 is formed.

Here, FIG. 13 is a plan view showing a comparative example in a case where no slit 90, 91 is formed. It is noted that, in the example shown in this FIG. 13 as well, a prescribed potential is applied across pixel electrode 26 and the common electrode and liquid crystal molecules 80 shown in this FIG. 13 are also located in the central portion in the direction of thickness of the liquid crystal layer.

In this FIG. 13, when no slit 90, 91 is formed in pixel electrode 26, an angle of orientation of liquid crystal molecules 80 is varied from director orientation D10 to director orientation D11, from the side of domain 70 toward the side of domain 71. The angle of orientation of the alignment orientation of liquid crystal molecule 80 located on the side of domain 70, among liquid crystal molecules 80 located on the boundary region between domain 70 and domain 71, is smaller than the angle of orientation of director orientation D10. This is because the angle of orientation of director orientation D11 of domain 71 is smaller than the angle of orientation of director orientation D10 of domain 70.

Then, the angle of orientation of the alignment orientation of liquid crystal molecule 80 located on the side of domain 71, among liquid crystal molecules 80 located on the boundary region between domain 70 and domain 71, is greater than the angle of orientation of director orientation D11.

Consequently, in the boundary region between domain 70 and domain 71, liquid crystal molecules 80 are not oriented in a prescribed orientation, which becomes the cause for occurrence of a dark line.

On the other hand, in the liquid crystal display apparatus according to the present embodiment, slits 90, 91 are formed so that disturbance of orientations of liquid crystal molecules 80 can be suppressed also in a region located in the boundary portion between domain 70 and domain 71. The principles thereof will be described with reference to FIG. 14.

Figure 14:
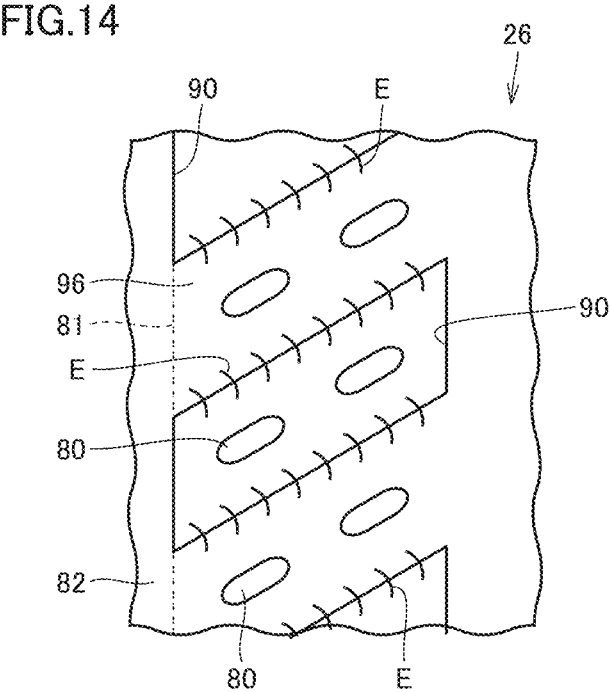
FIG. 14 is a plan view showing slit 90 and liquid crystal molecules 80.

FIG. 14 is a plan view showing slit 90 and liquid crystal molecules 80. As shown in this FIG. 14, when a prescribed potential is applied to pixel electrode 26, electric field E is generated between slit 90 and branch portion 96.

A direction of electric field E is perpendicular to a peripheral portion of slit 90 and the electric field distributes along an edge portion of slit 90 and branch portion 96.

Thus, positions of liquid crystal molecules 80 located on slit 90 and slit 91 are corrected.

Here, in a case where no slit 90 is formed, the alignment orientation of liquid crystal molecule 80 located on the side of flat surface region 82 in slit formation region 81 is smaller than director orientation D10. On the other hand, in liquid crystal display apparatus 2 according to the present embodiment, the angle of orientation of extension orientation D90 of slit 90 is not smaller than the angle of orientation of director orientation D10. Therefore, liquid crystal molecules 80 located on slit 90 and branch portion 96 are corrected such that the alignment orientation thereof is greater.

Consequently, the alignment orientations of liquid crystal molecules 80 located on slit 90 and branch portion 96 approximate to director orientation D10.

Here, as a potential is applied to pixel electrode 26 in FIG. 12, electric field is generated also between slit 91 and branch portion 97.

Consequently, positions of liquid crystal molecules 80 located on slit 91 and branch portion 97 are also corrected by the electric field.

The angle of orientation of extension orientation D91 of slit 91 is not greater than the angle of orientation of director orientation D11.

It is noted that, in a case where no slit 91 is formed, the angle of orientation of liquid crystal molecule 80 located on the side of domain 71 in slit formation region 81 is greater than the angle of orientation of director orientation D11.

On the other hand, since the angle of orientation of extension orientation D91 of slit 91 is not greater than the angle of orientation of director orientation D11, liquid crystal molecules 80 located on slit 91 and branch portion 97 are corrected such that the angle of orientation thereof is smaller.

Consequently, the orientations of liquid crystal molecules 80 located on slit 91 and branch portion 97 approximate to director orientation D11.

It is noted that, in the present embodiment, the angle of orientation of extension orientation D90 of slit 90 is not smaller than the angle of orientation of director orientation D10 and an angle formed between extension orientation D90 and director orientation D10 is not smaller than 0° and smaller than 45°. In addition, the angle of orientation of extension orientation D91 of slit 91 is not greater than the angle of orientation of director orientation D11 and an angle of intersection between extension orientation D91 and director orientation D11 is also not smaller than 0° and smaller than 45°.

With regard to a more preferred range of an angle of intersection between extension orientation D90, D91 and director orientation D10, D11, an angle formed between extension orientation D90 and director orientation D10 is not smaller than 0° and not greater than 30° and an angle formed between extension orientation D91 and director orientation D10 is in a range not smaller than 0° and not greater than 30°.

In addition, a preferred range of each angle of intersection is such that an angle formed between extension orientation D90 and director orientation D10 is not smaller than 0° and not greater than 15° and an angle formed between extension orientation D91 and director orientation D10 is in a range not smaller than 0° and not greater than 15°.

Namely, slit 90 is preferably formed to coincide with director orientation D10 of domain 70 or to extend along director orientation D10 and slit 91 is preferably formed to coincide with director orientation D11 of domain 71 or to extend along director orientation D11.

Though slit 90 and slit 91 have been described in detail, slit 91 and slit 92, slit 92 and slit 93, and slit 93 and slit 90 are also formed similarly to slit 90 and slit 91.

Here, as shown in FIG. 12 or the like, slit 90, 91 is in a shape elongated along extension orientation D90, D91. Specifically, slit 90, 91 is in a square shape including a long side portion extending in extension orientation D90, D91 and a short side portion laid out in extension orientation D90, D91.

Figure 15:
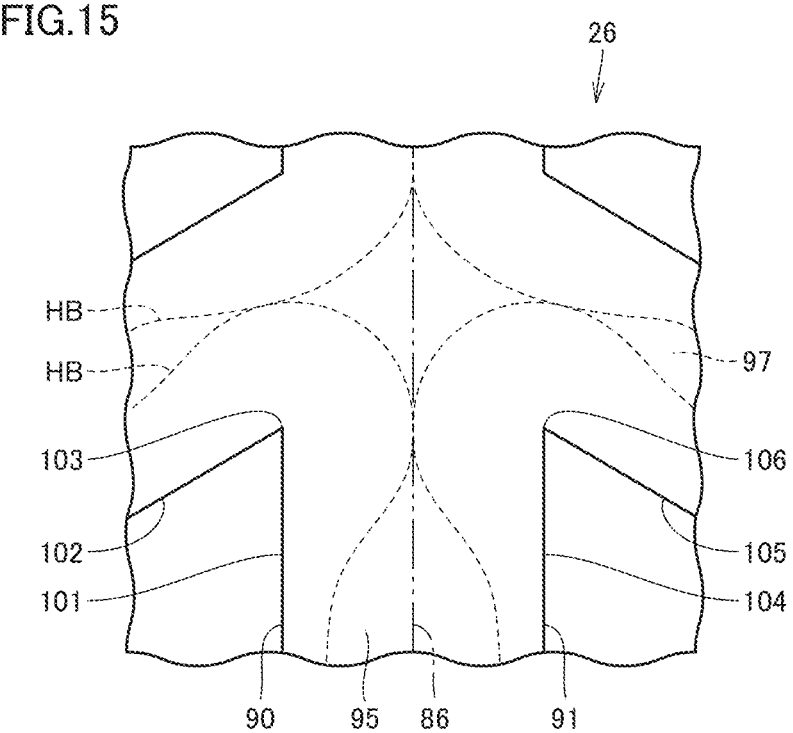
FIG. 15 is a plan view showing slit 90, slit 91, and a trunk portion 95.

FIG. 15 is a plan view showing slit 90, slit 91, and trunk portion 95. In this FIG. 15, a perimeter portion of slit 90 includes a short side portion 101 and a long side portion 102, and short side portion 101 and long side portion 102 form a vertex portion 103.

Similarly, a perimeter portion of slit 91 also includes a short side portion 104 and a long side portion 105, and short side portion 104 and long side portion 105 form a vertex portion 106.

Then, in FIG. 15, a high electric field region HB indicates a region high in intensity in electric field formed around slit 90 and slit 91.

As shown in this FIG. 15, wide high electric field region HB is formed around vertex portion 103 and vertex portion 106. Therefore, high electric field region HB is formed to reach a portion in the vicinity of boundary line 86 so that positions of many liquid crystal molecules 80 can be corrected and liquid crystal molecules 80 can be corrected over a wide range.

EXAMPLES

Examples of the present invention will be described with reference to FIGS. 16 to 23. It is noted that the features shown in FIGS. 16 to 23 the same as or corresponding to the features shown in FIGS. 1 to 15 above have the same reference characters allotted and description thereof may not be provided.

It is noted that FIGS. 16 to 23 show a manner in observing a pixel or a domain from the side of opposing substrate 21 while various liquid crystal display apparatuses 2 different in pixel electrode are prepared and a prescribed voltage is applied across pixel electrode 26 and common electrode 35.

It is noted that, in the present example as well, the angle of orientation of director orientation D10 of domain 70 is set to 225°. The angle of orientation of director orientation D11 of domain 71 is 135°. The angle of orientation of director orientation D12 of domain 72 is 45°. The angle of orientation of director orientation D13 of domain 73 is 315°.

Figure 16:
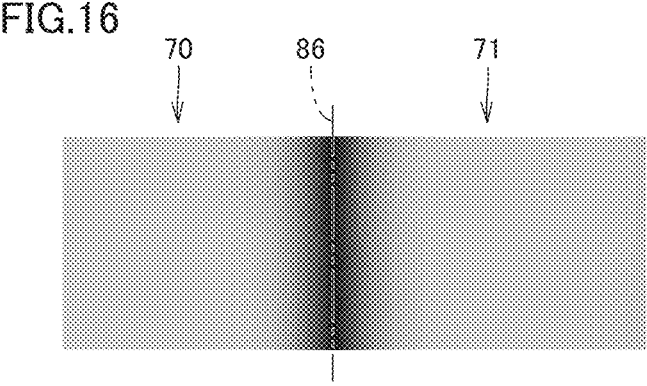
FIG. 16 is a plan view showing domains 70, 71 when a pixel electrode where no slit is formed is employed.

FIG. 16 is a plan view showing domains 70, 71 when a pixel electrode where no slit is formed is employed. In the example shown in this FIG. 16, it can be seen that a thick dark line is formed on and around boundary line 86. It is noted that FIG. 17 is a plan view showing domains 70 to 73 when the pixel electrode where no slit is formed is employed as the pixel electrode as in FIG. 16 above.

Figure 17:
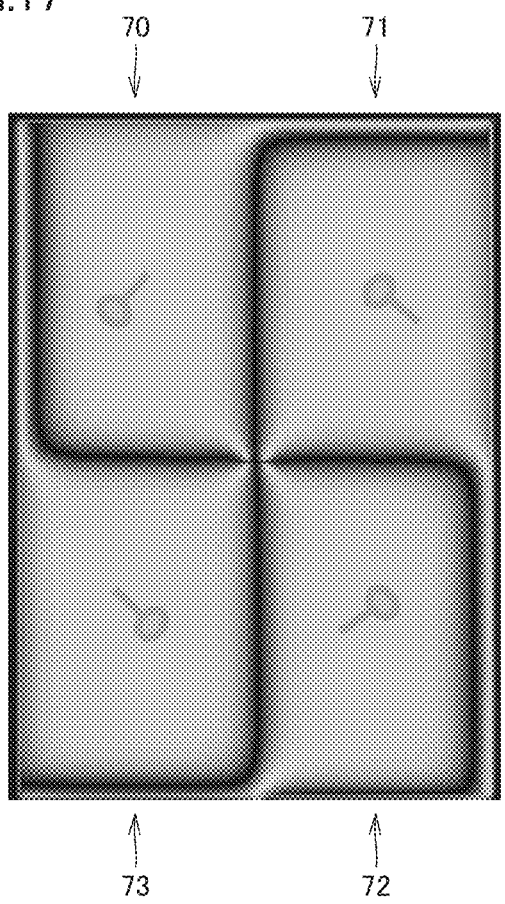
FIG. 17 is a plan view showing domains 70 to 73 when the pixel electrode where no slit is formed is employed as the pixel electrode as in FIG. 16 above.

As shown in this FIG. 17, it can be seen that the dark lines are formed also in the boundary portion between domain 70 and domain 71, in the boundary portion between domain 71 and domain 72, in the boundary portion between domain 72 and domain 73, and in the boundary portion between domain 73 and domain 70.

Figure 18:
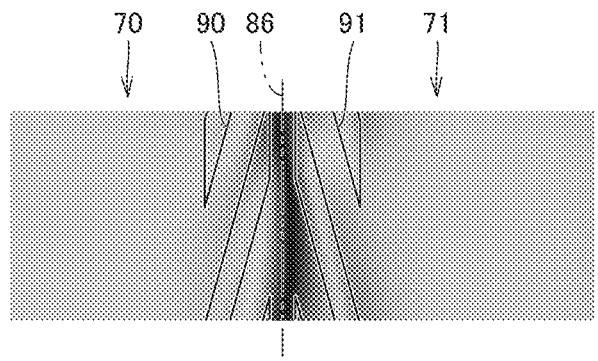
FIG. 18 is a plan view of domains 70, 71 observed when a pixel electrode where slits 90, 91 are formed is employed.
Figure 19:
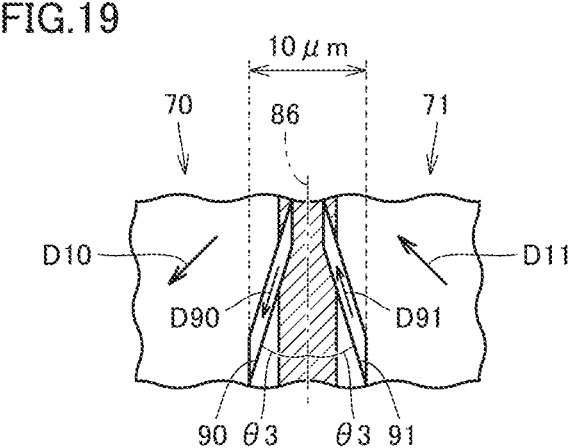
FIG. 19 is a plan view schematically showing FIG. 18.

FIG. 18 is a plan view of domains 70, 71 observed when a pixel electrode where slits 90, 91 are formed is employed, and FIG. 19 is a plan view schematically showing FIG. 18.

In this example shown in FIGS. 18 and 19, an angle θ3 formed between the extension orientation of slit 90, 91 and boundary line 86 is set to 15°. In other words, an angle of intersection between director orientation D10 and extension orientation D90 is 30° and an angle of intersection between director orientation D11 and extension orientation D91 is also 30°.

It can be seen that, in a case where such a slit 90, 91 is formed, the formed dark line is smaller in thickness than the dark line shown in FIG. 16, as is clear also from FIG. 18.

Figure 20:
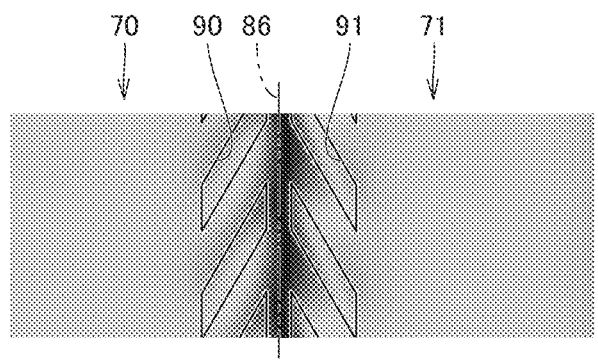
FIG. 20 is a plan view of domains 70, 71 observed when a pixel electrode where slits 90, 91 are formed is employed.
Figure 21:
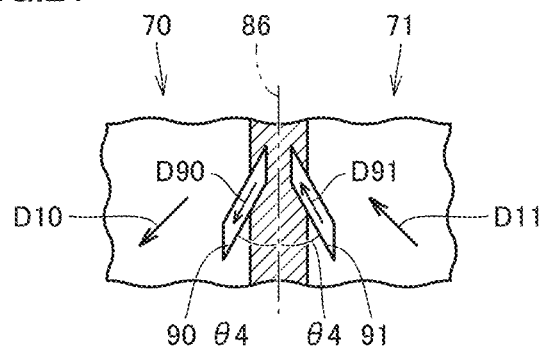
FIG. 21 is a plan view schematically showing FIG. 20.

FIG. 20 is a plan view of domains 70, 71 observed when a pixel electrode where slits 90, 91 are formed is employed, and FIG. 21 is a plan view schematically showing FIG. 20.

In this example shown in FIGS. 20 and 21, an angle θ4 formed between the extension orientation of slit 90, 91 and boundary line 86 is set to 30°. In other words, an angle of intersection between director orientation D10 and extension orientation D90 is 15° and an angle of intersection between director orientation D11 and extension orientation D91 is also 15°.

As is clear also from FIG. 20, it can be seen that the dark line shown in FIG. 20 is smaller in thickness than the dark line shown in FIG. 18.

Figure 22:
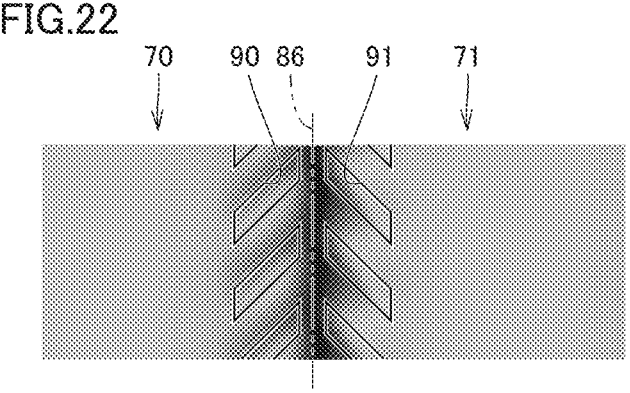
FIG. 22 is a plan view of domains 70, 71 observed when a pixel electrode where slits 90, 91 are formed is employed.
Figure 23:
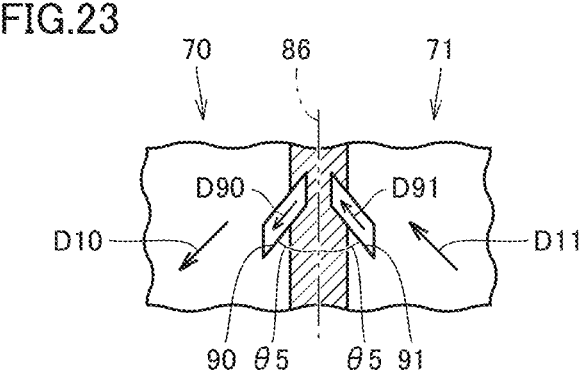
FIG. 23 is a plan view schematically showing FIG. 22.

FIG. 22 is a plan view of domains 70, 71 observed when a pixel electrode where slits 90, 91 are formed is employed, and FIG. 23 is a plan view schematically showing FIG. 22.

In the example shown in these FIGS. 22 and 23, an angle θ5 formed between the extension orientation of slit 90, 91 and boundary line 86 is set to 45°. In other words, an angle of intersection between director orientation D10 and extension orientation D90 is 0° and an angle of intersection between director orientation D11 and extension orientation D91 is also 0°.

As is clear also from FIG. 22, it can be seen that the dark line shown in FIG. 22 is smaller in thickness than the dark line shown in FIG. 16.

Figure 24:
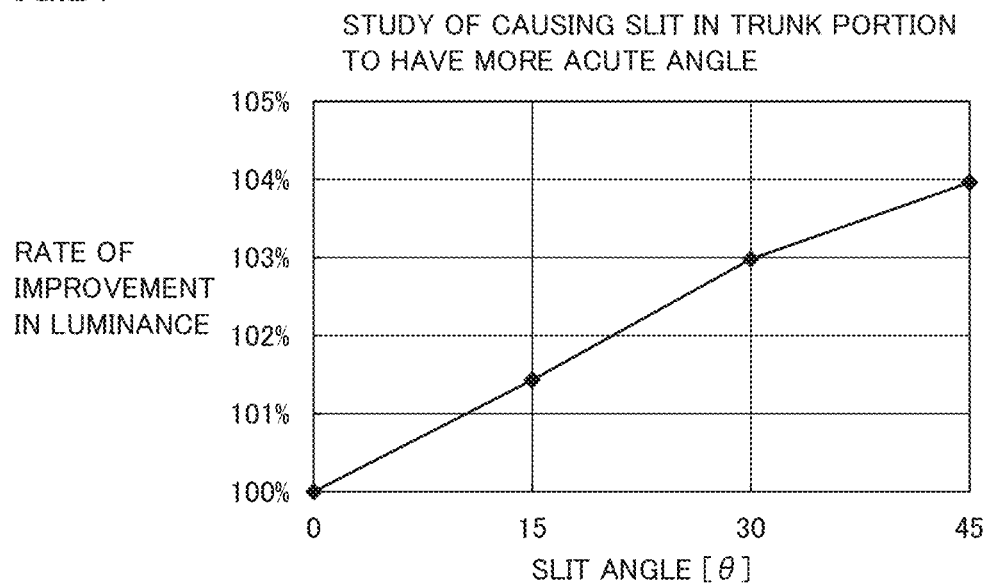
FIG. 24 is a graph showing comparison of luminances of liquid crystal display apparatuses 2 shown in FIGS. 16 to 23.

FIG. 24 is a graph showing comparison of luminances of liquid crystal display apparatuses 2 shown in FIGS. 16 to 23. The abscissa in this FIG. 24 represents an angle θ (θ3, θ4, θ5) of slit 90, 91. The ordinate represents luminances of liquid crystal display apparatuses 2 shown in FIGS. 18, 20, and 22, with luminance of liquid crystal display apparatus 2 shown in FIG. 16 where no slit 90, 91 is formed being assumed as 100%.

As is clear also from this FIG. 24, it can be seen that luminance of liquid crystal display apparatus 2 has improved as a result of formation of slit 90, 91 of which angle θ is greater than 0 degree.

In addition, it can be seen that high luminance can be obtained in a case where angle θ is not smaller than 15 degrees and not greater than 45 degrees. Furthermore, it can be seen that higher luminance can be obtained in a case where angle θ is not smaller than 30 degrees and not greater than 45 degrees.

Here, though an example where a slit is formed in pixel electrode 26 has been described as above, a slit may be formed in common electrode 35 and a slit may be formed in each of pixel electrode 26 and common electrode 35.

FIG. 25 is a plan view showing an example where slits are formed in common electrode 35. It is noted that, in the example shown in this FIG. 25, a plan view at the time when common electrode 35 is two-dimensionally viewed from a screen side is shown.

In the example shown in this FIG. 25 as well, common electrode 35 includes a slit formation region 181 opposed to portions in alignment regions 60 to 63, which is located around boundary lines among alignment regions 60 to 63, and flat surface regions 182 to 185 in a flat surface shape arranged to be adjacent to this slit formation region 181. A plurality of slits 190 to 193 are formed in this slit formation region 181.

In a portion of slit formation region 181 opposed to alignment region 60, a plurality of slits 190 are formed. In a portion of slit formation region 181 opposed to alignment region 61, slits 191 are formed. In a portion of slit formation region 181 opposed to alignment region 62, a plurality of slits 192 are formed. In a portion of slit formation region 181 opposed to alignment region 63, a plurality of slits 193 are formed. It is noted that an extension orientation of each slit 190, 191, 192, 193 is set to an orientation the same as the extension orientation of slit 90, 91, 92, 93 shown in FIG. 11.

Though the embodiment and the examples of the present invention have been described above, it should be understood that the embodiment and the examples disclosed herein are illustrative and non-restrictive in every respect. The scope of the present invention is defined by the terms of the claims, and is intended to include any modifications within the scope and meaning equivalent to the terms of the claims. In addition, the numeric value above or the like is by way of example and limitation to the numeric value and the range above is not intended.

INDUSTRIAL APPLICABILITY

The present invention is applicable to a liquid crystal display apparatus and particularly suitable for a liquid crystal display apparatus having a plurality of domains.

REFERENCE SIGNS LIST 1 television receiver; 2 liquid crystal display apparatus; 3 housing; 4 control unit; 5 front panel; 6 back surface case; 7 base; 8 window portion; 10 liquid crystal display panel; 11, 12 polarizing plate; 13 backlight unit; 14, 15 polarizing plate; 20 active matrix substrate; 21 opposing substrate; 22, 33 transparent substrate; 23 switching element; 24 gate interconnection; 25 source interconnection; 26 pixel electrode; 27 gate terminal portion; 28 source terminal portion; 29 liquid crystal layer; 30 gate electrode; 31 source electrode; 32 drain electrode; 34 color filter; 35 common electrode; 36 gate insulating film; 37 semiconductor layer; 38, 39 alignment film; 43 lower metal film; 44 upper metal film; 45, 46 amorphous silicon film; 50 interlayer insulating film; 51 passivation film; 52 planarizing film; 53 contact hole; 60, 61, 62, 63, 64, 65, 66, 67 alignment region; 70, 71, 71, 72, 73 domain; 80, 80A liquid crystal molecule; 81 slit formation region; 82, 83, 84, 85 flat surface region; 86, 87, 88, 89 boundary line; 90, 91, 92, 93 slit; 95 trunk portion; 96, 97 branch portion; 101, 104 short side portion; 102, 105 long side portion; 103, 106 vertex portion; D0, D1, D2, D3, D4, D5, D6, D7, alignment orientation; D10, D11, D12, D13 director orientation; D90, D91 extension orientation; DB reference orientation; E electric field; HB high electric field region; L1 distance; and W1, W2 width.

The invention claimed is:

1. A liquid crystal display apparatus, comprising:
a liquid crystal layer containing a plurality of liquid crystal molecules;
a first alignment film arranged to be adjacent to said liquid crystal layer;
a first alignment region provided in said first alignment film, for aligning said liquid crystal molecules;
a second alignment region provided in said first alignment film and arranged to be adjacent to said first alignment region, for aligning said liquid crystal molecules;
a first electrode arranged opposite to said liquid crystal layer with respect to said first alignment film;
a slit formation region provided in said first electrode, opposed to a portion adjacent to a boundary line between said first alignment region and said second alignment region, and extending in a direction of extension of said boundary line;
a first flat region in a flat surface shape, provided in said first electrode, arranged to be adjacent to said slit formation region, and opposed to said first alignment region;
a second flat region in a flat surface shape, provided in said first electrode, arranged to be adjacent to said slit formation region, and opposed to said second alignment region;
a plurality of first slits formed in a portion of said slit formation region, which is opposed to said first alignment region, and extending from a side of said boundary line toward said first flat region;
a plurality of second slits formed in a portion of said slit formation region, which is opposed to said second alignment region, and extending from the side of said boundary line toward said second flat region;
a second alignment film including a third alignment region opposed to said first alignment region with said liquid crystal layer being interposed and a fourth alignment region opposed to said second alignment region with said liquid crystal layer being interposed; and
a second electrode arranged opposite to said liquid crystal layer with respect to said second alignment film,
said first alignment region and said third alignment region being formed such that liquid crystal molecules located in a central portion between said first alignment region and said third alignment region among said liquid crystal molecules are aligned in a first director orientation when a voltage is applied across said first electrode and said second electrode,
said second alignment region and said fourth alignment region being formed such that liquid crystal molecules located in a central portion between said second alignment region and said fourth alignment region among said liquid crystal molecules are aligned in a second director orientation greater in angle of orientation than said first director orientation when a voltage is applied across said first electrode and said second electrode, and
with a direction from a side of said first flat region toward said boundary line among directions of extension of said first slits being defined as a first slit orientation and with a direction away from said boundary line among directions of extension of said second slits being defined as a second slit orientation,
an angle of orientation of said first slit orientation being not greater than an angle of orientation of said first director orientation, and
an angle of orientation of said second slit orientation being not smaller than an angle of orientation of said second director orientation.

2. The liquid crystal display apparatus according to claim 1, wherein
an angle of intersection between said first slit orientation and said first director orientation is not smaller than 0° and smaller than 45°, and
an angle of intersection between said second slit orientation and said second director orientation is not smaller than 0° and smaller than 45°.

3. The liquid crystal display apparatus according to claim 2, wherein
said first slit and said second slit are formed at a distance from each other with said boundary line lying therebetween.

4. The liquid crystal display apparatus according to claim 3, wherein
an alignment orientation of said first alignment region and an alignment orientation of said third alignment region intersect with each other, and
an alignment orientation of said second alignment region and an alignment orientation of said fourth alignment region intersect with each other.

5. The liquid crystal display apparatus according to claim 2, wherein
an alignment orientation of said first alignment region and an alignment orientation of said third alignment region intersect with each other, and
an alignment orientation of said second alignment region and an alignment orientation of said fourth alignment region intersect with each other.

6. The liquid crystal display apparatus according to claim 1, wherein
an angle of intersection between said first slit orientation and said first director orientation is not smaller than 0° and not greater than 30°, and
an angle of intersection between said second slit orientation and said second director orientation is not smaller than 0° and not greater than 30°.

7. The liquid crystal display apparatus according to claim 6, wherein
said first slit and said second slit are formed at a distance from each other with said boundary line lying therebetween.

8. The liquid crystal display apparatus according to claim 7, wherein
an alignment orientation of said first alignment region and an alignment orientation of said third alignment region intersect with each other, and
an alignment orientation of said second alignment region and an alignment orientation of said fourth alignment region intersect with each other.

9. The liquid crystal display apparatus according to claim 6, wherein
an alignment orientation of said first alignment region and an alignment orientation of said third alignment region intersect with each other, and
an alignment orientation of said second alignment region and an alignment orientation of said fourth alignment region intersect with each other.

10. The liquid crystal display apparatus according to claim 1, wherein
said first slit and said second slit are formed at a distance from each other with said boundary line lying therebetween.

11. The liquid crystal display apparatus according to claim 10, wherein
an alignment orientation of said first alignment region and an alignment orientation of said third alignment region intersect with each other, and
an alignment orientation of said second alignment region and an alignment orientation of said fourth alignment region intersect with each other.

12. The liquid crystal display apparatus according to claim 1, wherein
said first electrode is a pixel electrode.

13. The liquid crystal display apparatus according to claim 12, wherein
an alignment orientation of said first alignment region and an alignment orientation of said third alignment region intersect with each other, and
an alignment orientation of said second alignment region and an alignment orientation of said fourth alignment region intersect with each other.

14. The liquid crystal display apparatus according to claim 1, wherein
said first electrode is an opposing electrode.

15. The liquid crystal display apparatus according to claim 14, wherein
an alignment orientation of said first alignment region and an alignment orientation of said third alignment region intersect with each other, and
an alignment orientation of said second alignment region and an alignment orientation of said fourth alignment region intersect with each other.

16. The liquid crystal display apparatus according to claim 1, wherein
an alignment orientation of said first alignment region and an alignment orientation of said third alignment region intersect with each other, and
an alignment orientation of said second alignment region and an alignment orientation of said fourth alignment region intersect with each other.

* * * * *